(12) United States Patent
Otsuki et al.

(10) Patent No.: US 8,451,229 B2
(45) Date of Patent: May 28, 2013

(54) MONOCULAR VIDEO DISPLAY DEVICE

(75) Inventors: Masaki Otsuki, Yokohama (JP);
Nobuyuki Miyake, Hiratsuka (JP);
Yasuki Nagaoka, Saitama (JP); Toru Fujie, Tokyo (JP)

(73) Assignee: Nikon Corporation, Tokyo (JP)

( * ) Notice: Subject to any disclaimer, the term of this patent is extended or adjusted under 35 U.S.C. 154(b) by 616 days.

(21) Appl. No.: 12/309,394

(22) PCT Filed: Jul. 20, 2007

(86) PCT No.: PCT/JP2007/064344
§ 371 (c)(1),
(2), (4) Date: Jan. 23, 2009

(87) PCT Pub. No.: WO2008/013111
PCT Pub. Date: Jan. 31, 2008

(65) Prior Publication Data
US 2010/0007608 A1    Jan. 14, 2010

(30) Foreign Application Priority Data

Jul. 25, 2006    (JP) ................. 2006-201491
Aug. 24, 2006    (JP) ................. 2006-227255
Dec. 14, 2006    (JP) ................. 2006-336683

(51) Int. Cl.
*G06F 3/02*    (2006.01)
*H04R 25/00*    (2006.01)

(52) U.S. Cl.
USPC ........................................ 345/168; 381/376

(58) Field of Classification Search
None
See application file for complete search history.

(56) References Cited

U.S. PATENT DOCUMENTS

2002/0149545 A1    10/2002    Hanayama et al.
2006/0119539 A1    6/2006    Kato et al.

FOREIGN PATENT DOCUMENTS

| JP | A-2004-029158 | 1/2004 |
| JP | A-2004-233776 | 8/2004 |
| WO | WO 01/37558 A1 | 5/2001 |
| WO | WO 2004/061519 A1 | 7/2004 |

*Primary Examiner* — K. Wong
(74) *Attorney, Agent, or Firm* — Oliff & Berridge, PLC

(57) ABSTRACT

A cross key is mounted on a headphone. When a support arm and a connection section are pivoted 180 degrees from the (a)-state to change the position of wearing the headphone between left and right, a head-mounted display is set for use by the right eye, and this turns the cross key upside down. Correspondingly, a function allocated to the upper key is allocated to the lower key and a function allocated to the lower key is allocated to the upper key to obtain the (b)-state. In the (b)-state, the functions are changed such that the function allocated to the upper key is allocated to the upper key and the function allocated to the lower key is allocated to the lower key. A cross key does not require any change in key functions and left as is.

4 Claims, 6 Drawing Sheets

(a)

(b)

(c)

MONOCULAR VIDEO DISPLAY DEVICE

TECHNICAL FIELD

The present invention relates to an output device.

BACKGROUND ART

Recently there have been various glasses-type video display devices in which video displayed on a display device such as a Liquid Crystal Display (LCD) is observed as a virtual image enlarged through an optical system having an eyepiece, a half mirror, or the like. The glasses-type video display devices are called a head-mounted display. For example, WO2004/061519A1 (Patent Document 1) discloses a head-mounted display.

Many video display devices are configured in such a way that they are worn on a face while wrapped around a head. Video display devices are mainly divided into a binocular type in which the video display system is formed at positions corresponding to eyes and a monocular type in which the video display system is formed at a position corresponding to one of the right and left eyes. Usually the head-mounted display includes a display unit which displays video and a headphone which supplies sound. The headphone which is of a kind of the output device is widely used as a sound output device for listening to music.

Manipulation components (such as a switch) used to manipulate the head-mounted display can be provided in a control box or the like which is formed independently of a main body unit to be mounted on the head. On the other hand, there has been made an attempt to attach the manipulation components to a headphone unit or a headphone retaining unit of the head-mounted display main body unit to be mounted on the head.

Patent Document 1: WO2004/061519A1
Patent Document 2: Japanese Patent Application Laid-Open No. 2004-233776

DISCLOSURE OF THE INVENTION

Problem to be Solved by the Invention

In head-mounted displays for single eye which, a head-mounted display is becoming mainstream, which includes two headphone units which are connected to each other by a connection unit, a support arm which is attached to one of the headphone units while being turnable about a lateral direction in mounting the head-mounted display, and a display unit which is attached to a leading-end portion of the support arm in order to display video to a single eye of a user, and has a function in which the support arm is turned by about 180° to switch the right and left of the headphones to be mounted, thereby switching the single eye for which the video is displayed between the right and the left. For example, Japanese Patent Application Laid-Open No. 2004-233776 (Patent Document 2) discloses such a head-mounted display.

In such a head-mounted display, when the manipulation components are attached to the headphone unit, the front and the rear of an manipulation component attached position is replaced with each other depending on whether the head-mounted display is used for the right eye or the left eye, which results in a problem that manipulation becomes troublesome. Therefore, for example, the problem is solved by displaying buttons on a screen in Japanese Patent Application Laid-Open No. 2004-233776 (Patent Document 2). However, there is a limitation to a screen layout. Sometimes the head-mounted display is manipulated using a remote control box or the like.

In such cases, unfortunately a cable may becomes an obstacle or the remote control box may be lost.

In the case where manipulation members are attached to the headphone retaining unit, many manipulation members cannot be arranged because a size of the retaining unit is restricted.

Objects of the present invention are to provide a video output device in which manipulation components are easily manipulated even when used while switched between the right eye and the left eye, and to provide a video output device in which functions of the manipulation members are easily distinguished from one another with a devised layout of the manipulation members even if many manipulation members are arranged.

Means for Solving the Problem

According to a first aspect of the present invention, an output device which is used while mounted on a head in order to supply at least one of sound and video includes two fixing units which are used to mount the output device on the head; and a connection unit which connects the fixing units, wherein a first group of manipulation members is disposed in at least one of the connection unit and the fixing units, and an executed function is changed in at least one of the first group of manipulation members.

According to a second aspect of the present invention, in the output device of the first aspect, the output device includes a display unit which is connected to one of the connection unit and the fixing units in order to display video to a single eye of a user, wherein in the at least one of the first group of manipulation members in which the executed function is changed, the function is changed according to switching of the single eye for observing the display unit between the right and the left.

According to a third aspect of the present invention, in the output device of the second aspect, in the first group of manipulation members functions executed by manipulation of the manipulation members are changed such that a function defined by a front-to-rear layout of the manipulation members becomes identical with the function defined before the change when the single eye for observing the display unit is switched between the right and the left.

According to a fourth aspect of the present invention, in the output device of the second aspect, the output device includes a second group of manipulation members which is connected to the output device in a wired or wireless fashion to manipulate the output device or a device connected to the output device, wherein at least one of the first group of manipulation members and at least one of the second group of manipulation members have identical function, in the first group of manipulation members functions executed by manipulation of the manipulation members are changed such that a function defined by the front-to-rear layout of the first group of manipulation members becomes identical with the function defined before the change when the single eye for observing the display unit is switched between the right and the left, and in the second group of manipulation members functions executed by manipulation of the manipulation members corresponding to manipulation members in which functions are changed in the first group of manipulation members are not changed when the single eye for observing the display unit is switched between the right and the left.

According to a fifth aspect of the present invention, in the output device of the third or fourth aspect, in the first group of manipulation members, an operation performed by manipulation of a manipulation member is not described in the manipulation member in which executed function is changed when the single eye for observing the display unit is switched between the right and the left.

According to a sixth aspect of the present invention, in the output device of the first aspect, the first group of manipulation members includes: at least two of a third group of manipulation members in which executed functions are changed according to an operating mode; and at least two of a fourth group of manipulation members each of which has a single function, and the fourth group of manipulation members is arranged in a direction different from a direction in which the third group of manipulation members is arranged.

According to a seventh aspect of the present invention, in the output device of the sixth aspect, the fourth group of manipulation members is arranged so as to be sandwiched between at least two manipulation members constituting the third group of manipulation members.

According to an eighth aspect of the present invention, in the output device of the seventh aspect, in order to recognize finger contact, a guide unit is provided along a line connecting one of the third group of manipulation members or the fourth group of manipulation members and at least one of the fourth group of manipulation members.

According to a ninth aspect of the present invention, in the output device of the eighth aspect, the guide unit is not formed into a linear shape.

According to a tenth aspect of the present invention, in the output device of the ninth aspect, the guide member has a part of an arc shape whose radius is substantially equal to a length of a human's finger, and the guide member is disposed in the arc shape whose radius is substantially equal to the length of the human's finger.

According to an eleventh aspect of the present invention, in the output device of the second aspect, the output device includes a support arm which is attached to one of the connection unit and the fixing units while being turnable about a lateral direction in mounting the output device, wherein the display unit is attached to a leading-end portion of the support arm, the support arm is turned by about 180°, and the right and left of the fixing units to be mounted is switched, thereby switching the single eye for observing the display unit between the right and the left, the first group of manipulation members is symmetrically attached along a front-to-rear direction, a symmetrically-located pair in the first group of manipulation members has an identical function, and only one of the symmetrically-located pair in the first group of manipulation members is enabled according to a direction in which the output device is mounted, thereby changing executed function of at least one of the first group of manipulation members.

According to a twelfth aspect of the present invention, in the output device of the eleventh aspect, finger notches are symmetrically provided in a front-to-rear direction in the fixing unit to which the first group of manipulation members is attached.

According to a thirteenth aspect of the present invention, in the output device of the eleventh or twelfth aspect, the first group of manipulation members is provided on a base, and only one of the symmetrically-located pair in the first group of manipulation members is projected outside the fixing unit to be able to be manipulated by causing the base to slide in the front-to-rear direction, while the other of the symmetrically-located pair in the first group of manipulation members is hidden in the fixing unit to become disabled from the outside.

According to a fourteenth aspect of the present invention, in the output device of the thirteenth aspect, the output device includes a cover with which the fixing unit is covered, wherein the cover has a function of preventing the base from sliding.

According to a fifteenth aspect of the present invention, in the output device of the eleventh or twelfth aspect, the output device includes a cover with which the fixing unit is covered, wherein one of the symmetrically-located pair in the first group of manipulation members is covered with the cover, and the other of the symmetrically-located pair in the first group of manipulation members is not covered with the cover, whereby only the one of the symmetrically-located pair of the first group of manipulation members can be manipulated.

Effect of the Invention

Accordingly, the video output device in which the manipulation component is easily manipulated can be provided even in the output device which can be used while switched between the right eye and the left eye, and the video output device in which the functions of the manipulation members are easily distinguished from one another can be provided by devising a layout of the manipulation members even if the many manipulation members are arranged.

Figure 1:
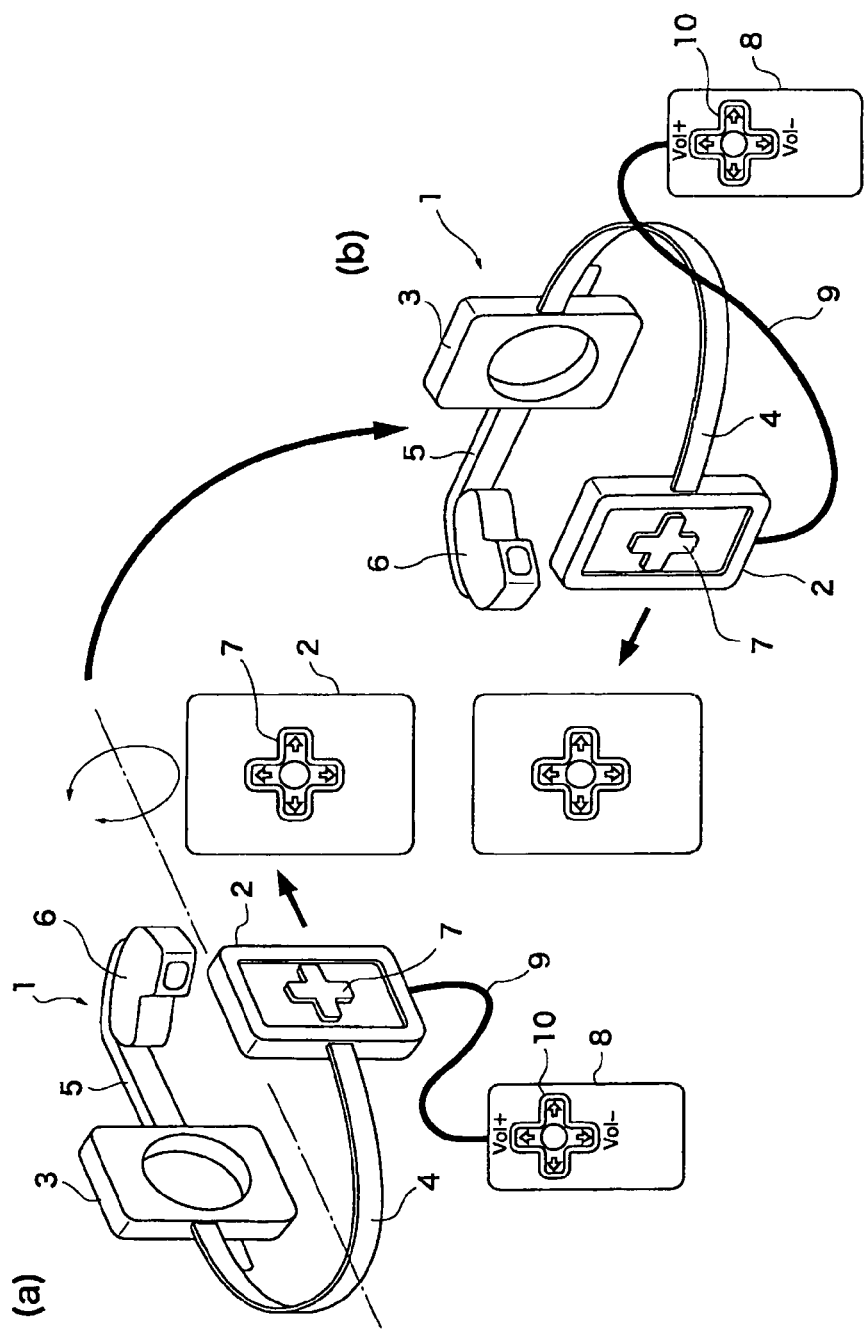
FIG. 1 is a view showing an outline of a head-mounted display according to a first embodiment of the present invention.

EXPLANATIONS OF LETTERS OR NUMERALS 1 head-mounted display
2 and 3 headphone
4 connection unit
5 support arm
6 display unit
7 cross key
8 control box
9 cable
10 cross key
11 and 12 ear pad
13 and 14 retaining unit
15 headband unit
16 display unit
17 display unit arm
18 turn unit
19 manipulation unit
20 to 23 push-button switch
24 dial
31 to 34 push-button switch
35 and 36 dial
37a to 37d guide member
41 to 44 push-button switch
45 dial 46a to 46d guide member
51 to 54 push-button switch
55 dial
56a and 56b guide member
61 to 64 push-button switch
65 and 66 dial
67a and 67b guide member
71 head-mounted display
72 and 73 headphone
74 connection unit
75 support arm
76 display unit
77 pressing member
78 turn member
79L and 79R manipulation component
80L and 80R finger notch
81 board
82 cover

BEST MODE FOR CARRYING OUT THE INVENTION

Embodiments of the present invention will be described below with reference to the drawings. FIG. 1 is a view showing an outline of a head-mounted display (output device) according to a first embodiment of the present invention. FIG. 1(a) shows the case in which the head-mounted display 1 is used for the left eye, and FIG. 1(b) shows the case in which the head-mounted display 1 is used for the right eye.

In the head-mounted display 1, headphones 2 and 3 which are of two fixed units are connected by a connection unit 4, and the connection unit 4 has an elastic property. In mounting the head-mounted display 1, the ears are sandwiched between the headphones 2 and 3, and the headphones 2 and 3 are pressed against the ears by the elasticity of the connection unit 4. A support arm 5 is attached to the headphone 3 so as to be turnable about a lateral direction in mounting the head-mounted display 1, and a display unit 6 is attached to a leading-end portion of the support arm 5 in order to display video to the user's eye.

A cross key 7 which is of the first group of manipulation members is attached to the headphone 2. In the first embodiment, in keys of the cross key 7, the upper key gives an instruction to increase volume, the lower key gives an instruction to decrease the volume, the front-side key gives an instruction to perform music, and the rear-side key gives an instruction to rewind. However, indications for the instructions are not engraved.

A control box 8 is attached to the headphone 2 through a cable 9, and a cross key 10 which is of the second group of manipulation members is attached to the control box 8. The cross key 7 and the cross key 10 are configured so as to fulfill the same functions, and the user can preferentially select one of the cross key 7 and the cross key 10 to manipulate. Alternatively, the control box 8 is detachably attached to the headphone 2 by a connector or the like, and the user may preferentially select one of the cross key 7 and the cross key 10 to manipulate. A signal exchange between the headphone 2 and the control box 8 may be performed wirelessly.

When the support arm 5 and the connection unit 4 are turned by 180° to invert the right and left of the device to be mounted, the head-mounted display 1 can be used for the right eye as shown in FIG. 1(b). At this point, the cross key 7 is placed upside down. When the head-mounted display 1 becomes the state of FIG. 1(b), the functions are changed such that the function allocated to the upper-side key in FIG. 1(a) is allocated to the lower-side key while the function allocated to the lower-side key in FIG. 1(a) is allocated to the upper-side key. Because it is not necessary to change the key function of the cross key 10, the cross key 10 can be left whole.

The reason why engraved marks for indicating the functions of the cross key 7 are eliminated in the headphone 2 as described above is that the key functions are changed according to a state of the right and left of the device to be mounted. On the other hand, in the control box 8, because the functions of the cross key 10 are not changed, the functions can be indicated by engraved marks or the like.

In the head-mounted display of the first embodiment, the control box 8 may be eliminated.

Figure 2:
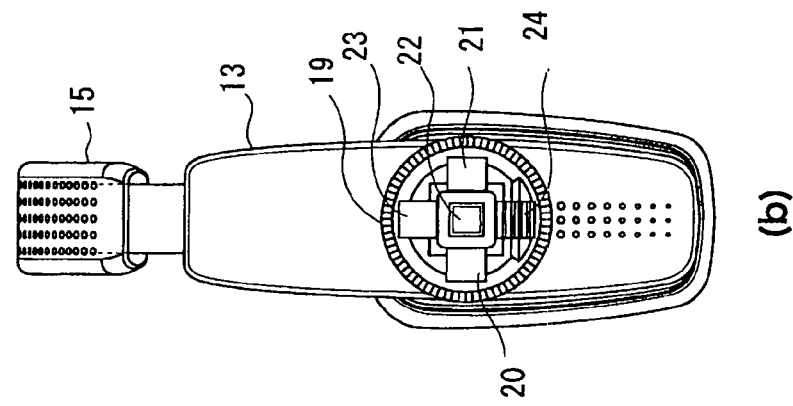
FIG. 2 is a view showing an outline of a head-mounted display according to a second embodiment of the present invention.
Figure 2:
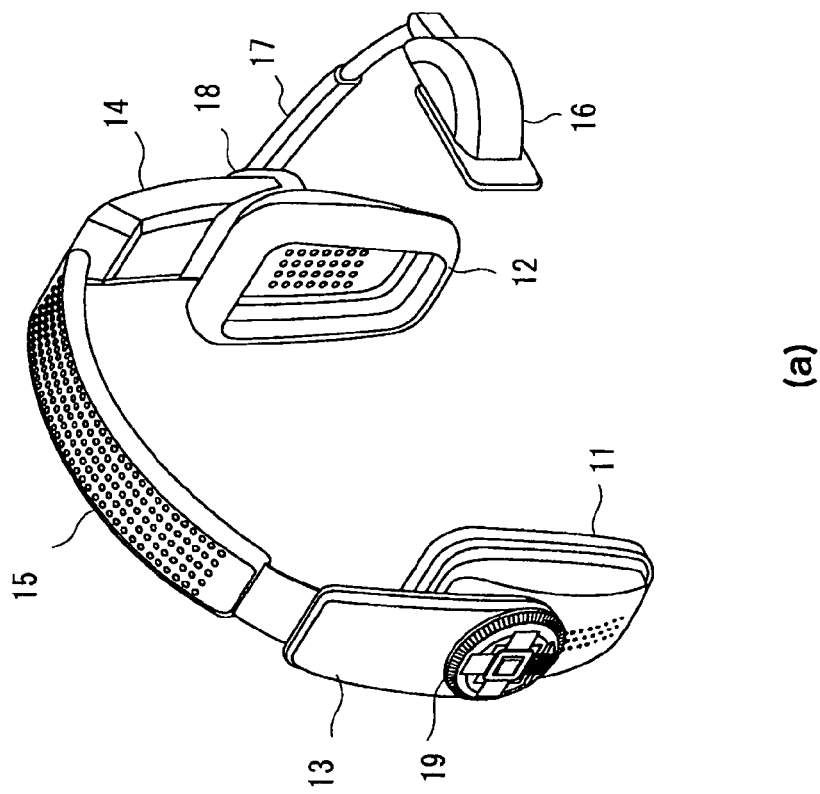

FIG. 2 is a view showing an outline of a head-mounted display (output device) according to a second embodiment of the present invention. FIG. 2(a) is a perspective view of the head-mounted display, and FIG. 2(b) is a view showing the head-mounted display when the head-mounted display is viewed from the left side of FIG. 2(a). The head-mounted display includes ear pads 11 and 12 which are of the fixing unit. The ear pads 11 and 12 are pressed against the ears from the right and the left to fix the head-mounted display onto the head. A speaker is provided in each of the ear pads 11 and 12 in order to supply sound to each ear. The ear pads 11 and 12 are fixed to retaining units 13 and 14 while universal hinges are interposed therebetween, respectively. The right and left retaining units 13 and 14 are slidably inserted into a head band unit 5, and the retaining units 13 and 14 are connected by the head band unit 15. The head band unit 15 has an elastic property, and the head band unit 15 imparts a biasing force for pressing the ear pads 11 and 12 against the ear portions from the right and the left. A display unit 16 is retained by a display unit arm 17, and the display unit arm 17 is coupled to the retaining unit 14 while a turn unit 18 is interposed therebetween, which allows the display unit 16 to be turned in a front-to-rear direction in mounting the head-mounted display. The right and left retaining units 13 and 14 and the head band unit 15 constitute the connection unit.

A manipulation unit 19 is provided in the retaining unit 13, and push-button switches 20, 21, 22, and 23 and a dial 24 which are of the first group of manipulation members are provided in the manipulation unit 19. Two or more different functions depending on the mode are imparted to the push-button switches 20 and 21 (hereinafter referred to as third group of manipulation members), and a single function is imparted to the push-button switches 22 and 23 and the dial 24 (hereinafter referred to as fourth group of manipulation members). The push-button switches 20 and 21 are arranged in line in a horizontal direction, and the push-button switches 22 and 23 and the dial 24 are arranged in line in a vertical direction. Therefore, the user can recognize whether each manipulation member is of the third group of manipulation members or of the fourth group of manipulation members based on the direction in which the manipulation members are arranged.

For example, in a screen on which a menu is manipulated, a switch 21 is used as an OK button, a switch 20 is used as a cancel button, and a dial 24 is used to vertically move a cursor. In a screen on which music or the like is reproduced, the switch 21 is used as a forward button, the switch 20 is used as a rewind button, and a switch 22 is used as a reproduction/stop button. In the embodiment, the switch 22 and the dial 24 which are not shared are disposed between the shared switches 20 and 21 so as to be sandwiched, so that finger travel distance can be reduced to improve operability.

Figure 3:
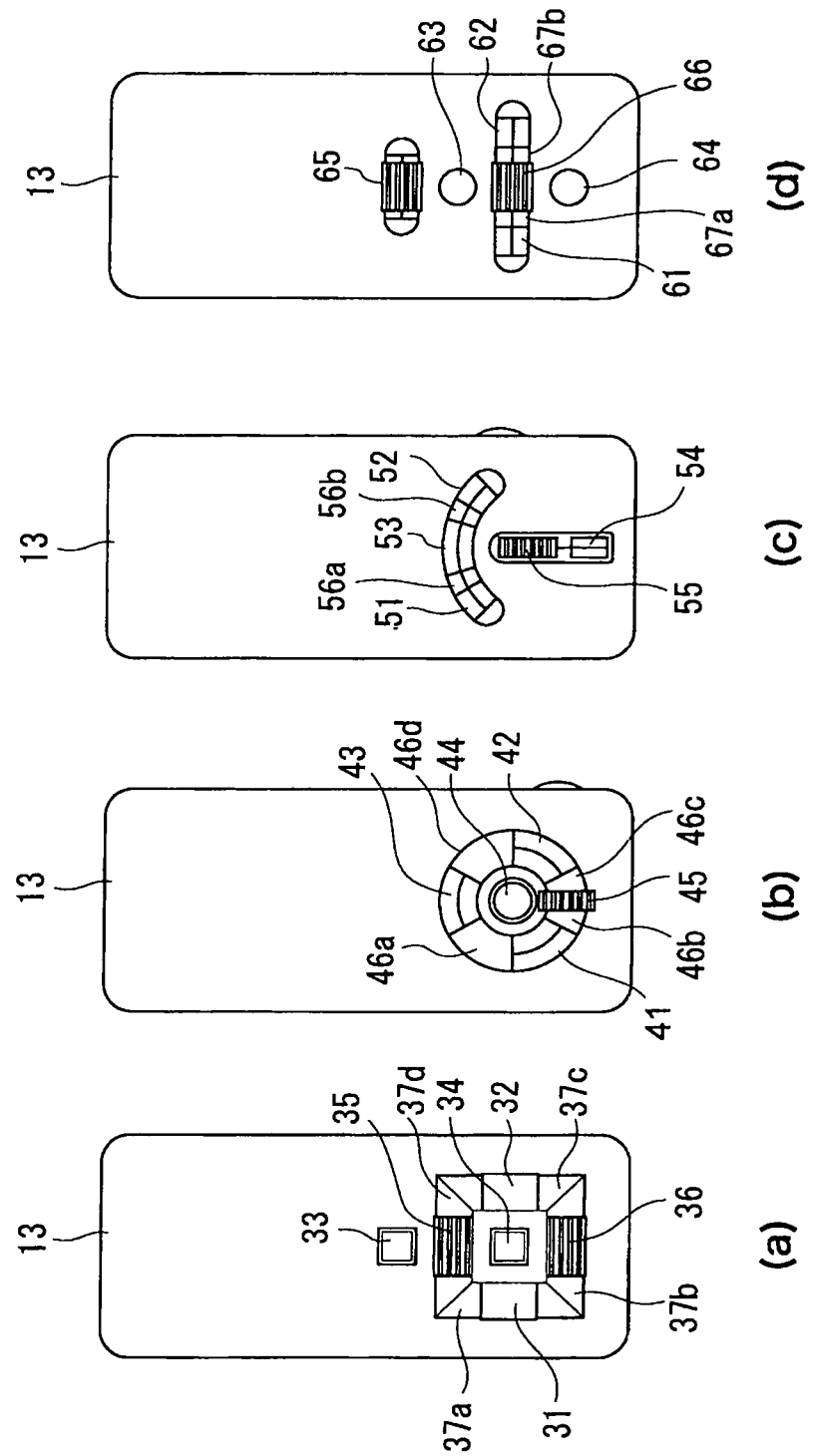
FIG. 3 is a view showing examples of a layout of manipulation members.

FIG. 3 is a view showing examples of a layout of the first group of manipulation members. In FIG. 3(a), push-button switches 31 and 32 are of the third group of manipulation members, and the push-button switches 31 and 32 are arranged in the horizontal direction. Push-button switches 33 and 34 and dials 35 and 36 are of the fourth group of manipulation members, and the push-button switches 33 and 34 and dials 35 and 36 are arranged in the vertical direction. A guide member 37*a* is provided along a line (L-shape) connecting the push-button switch 31 and the dial 35, a guide member 37*b* is provided along a line (L-shape) connecting the push-button switch 31 and the dial 36, a guide member 37*c* is provided along a line (L-shape) connecting the push-button switch 32 and the dial 36, and a guide member 37*d* is provided along a line (L-shape) connecting the push-button switch 32 and the dial 35. Therefore, an operator traces the guide members with an operator's finger to recognize a positional relationship among the manipulation members, whereby easily distinguishing manipulation member functions from one another.

FIG. 3(*b*) shows another example of the layout of the first group of manipulation members. Push-button switches 41 and 42 are of the third group of manipulation members, and the push-button switches 41 and 42 are arranged in the horizontal direction. Push-button switches 43 and 44 and a dial 45 are of the fourth group of manipulation members, and the push-button switches 43 and 44 and the dial 45 are arranged in the vertical direction. A guide member 46*a* is provided along a line (arc shape) connecting the push-button switch 41 and the push-button switch 43, a guide member 46*b* is provided along a line (arc shape) connecting the push-button switch 41 and the dial 45, a guide member 46*c* is provided along a line (arc shape) connecting the push-button switch 42 and the dial 45, and a guide member 46*d* is provided along a line (arc shape) connecting the push-button switch 42 and the push-button switch 43.

FIG. 3(*c*) shows still another example of the layout of the first group of manipulation members. Push-button switches 51 and 52 are of the third group of manipulation members, and the push-button switches 51 and 52 are arranged in the horizontal direction. Push-button switches 53 and 54 and a dial 55 are of the fourth group of manipulation members, and the push-button switches 53 and 54 and the dial 55 are arranged in the vertical direction. A guide member 56*a* is provided along a line (arc shape) connecting the push-button switch 51 and the push-button switch 53, and a guide member 56*b* is provided along a line (arc shape) connecting the push-button switch 52 and the push-button switch 53. In the example of FIG. 3(*c*), the push-button switch 51, the push-button switch 52, the guide member 56*a*, and the guide member 56*b* have an arc shape whose radius is substantially equal to a length of a human's finger (in the embodiment, an index finger or a middle finger), and the push-button switch 51, the push-button switch 52, the guide member 56*a*, and the guide member 56*b* are arranged on the arc having the radius which is substantially equal to the length of the human's finger. Accordingly, it becomes more easily to recognize positions by the finger contact.

FIG. 3(*d*) shows still another example of the layout of the first group of manipulation members. Push-button switches 61 and 62 are of the third group of manipulation members, and the push-button switches 61 and 62 are arranged in the horizontal direction. Push-button switches 63 and 64 and dials 65 and 66 are of the fourth group of manipulation members, and the push-button switches 63 and 64 and the dials 65 and 66 are arranged in the vertical direction. A guide member 67*a* is provided along a line (linear shape) connecting the push-button switch 61 and the dial 66, and a guide member 67*b* is provided along a line (linear shape) connecting the push-button switch 62 and the dial 66.

From the viewpoint of operability, preferably the guide member should not be linearly formed as much as possible. In the head-mounted display of the second embodiment, when the single eye used to observe the display unit 16 is switched between the right and the left, the function of the push-button switch 20 and the function of the push-button switch 21 may be replaced with each other.

Figure 4:
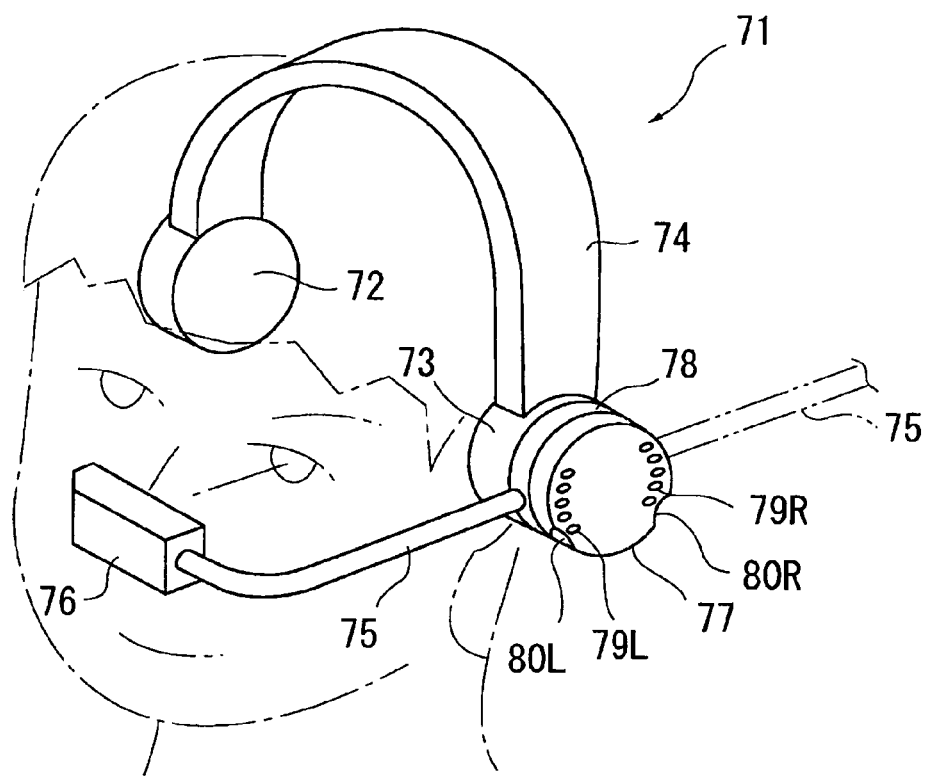
FIG. 4 is a view showing an outline of a head-mounted display according to a third embodiment of the present invention.

FIG. 4 is a view showing an outline of a head-mounted display (output device) according to a third embodiment of the present invention. In a head-mounted display 71, headphones 72 and 73 which are of the two fixing units are connected to each other by a connection unit 74, and the connection unit 74 has an elastic property. In mounting the head-mounted display 71, the ears are sandwiched between the headphones 72 and 73, and the headphones 72 and 73 are pressed against the ears by the elasticity of the connection unit 74. A support arm 75 is attached to the headphone 73 so as to be turnable about the lateral direction in mounting the head-mounted display 71, and a display unit 76 is attached to a leading-end portion of the support arm 75 in order to display the video to the user's eye. That is, a turn member 78 is fitted between the headphone 73 and a pressing member 77 (in such a way that the headphone 73 and the pressing member 77 are not relatively moved), and the support arm 75 is attached to the turn member 78. The headphone 72 corresponds to a headphone unit, and a combination of the headphone 73, pressing member 77, and turn member 78 corresponds to another headphone unit.

FIG. 4 shows the state in which the head-mounted display is used for the left eye. The support arm 5 is turned by 180° from the state shown by a solid line to the state shown by a long dashed double-short dashed line in FIG. 4, and positions of the headphones 72 and 73 are replaced with each other between the right and the left, so that the head-mounted display can be used for the right eye.

In the pressing member 77, groups of manipulation components 79R and 79L which are of the first group of manipulation members are symmetrically provided along the front-to-rear direction. Each five of the groups of manipulation components 79R and 79L are provided in FIG. 4, and the groups of manipulation components 79R and 79L are manually manipulated to operate the head-mounted display 71. In order to facilitate the manipulation, finger notches 80R and 80L are symmetrically provided along the front-to-rear direction in the pressing member 77. A pair of manipulation components symmetrically located along the front-to-rear direction has the same function.

The group of manipulation components 79L provided on the front side of the pressing member 77 is manipulated when the head-mounted display 71 is used for the left eye. At this point, manipulation of the group of manipulation components 79R is disabled. For example, the turn direction of the support arm 75 is detected to detect that the head-mounted display 71 is used for the left eye, and operation of the group of manipulation components 79L is enabled while operation of the group of manipulation components 79R is disabled.

When the head-mounted display 71 is used for the right eye, the group of manipulation components 79R provided on the rear side of the pressing member 77 is manipulated (in FIG. 1, the group of manipulation components 79R is located on the rear side, but because the pressing member 77 is inverted in the front-to-rear direction when the head-mounted display 71 is used for the right eye, the user manipulates the group of manipulation components located on the front side with respect to the user). At this point, manipulation of the group of manipulation components 79L is disabled. For example, the turn direction of the support arm 75 is detected to detect that the head-mounted display 71 is used for the right eye, and operation of the group of manipulation components 79R is enabled while operation of the group of manipulation components 79L is disabled.

Thus, in the embodiment, either in the case where the head-mounted display 71 is used for the left eye or in the case where the head-mounted display 71 is used for the right eye, the user manipulates the manipulation component located on the front side of the pressing member 77 with respect to the user, so that the user can easily manipulate the manipulation components with no confusion.

Figure 5:
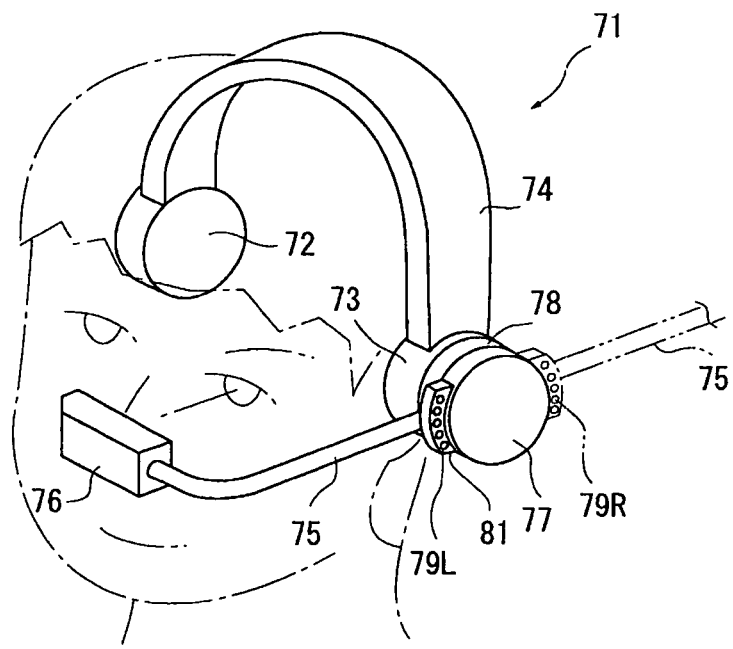
FIG. 5 is a view showing an outline of a head-mounted display according to a fourth embodiment of the present invention.
Figure 5:
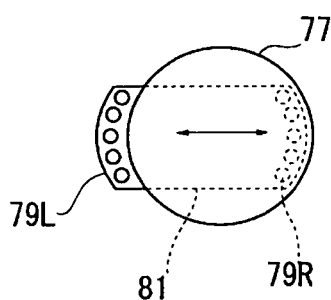
Figure 5:
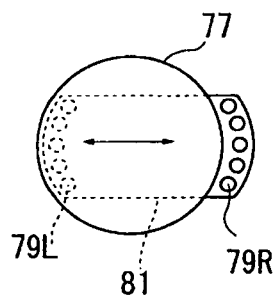

FIG. 5 is a view showing an outline of a head-mounted display according to a fourth embodiment of the present invention.

In the fourth embodiment of FIG. 5, the group of manipulation components 79R and the group of manipulation components 79L are provided in a board 81, and the board 81 is arranged to slide in the front-to-rear direction in the pressing member 77. As shown in FIG. 5(b), when the group of manipulation components 79L is projected outside the board 81, the group of manipulation components 79R is hidden in the board 81. As shown in FIG. 5(c), when the group of manipulation components 79R is projected outside the board 81, the group of manipulation components 79L is hidden in the board 81.

When the head-mounted display 71 is used for the left eye, the group of manipulation components 79L is used while projected from the board 81 as shown by the solid line of FIG. 5(a). On the other hand, when the head-mounted display 71 is used for the right eye, the group of manipulation components 79R is used while projected from the board 81 as shown by the long dashed double-short dashed line of FIG. 5(a). Therefore, the user can always use the group of manipulation components located on the front side of the pressing member 77, and the user is prevented from touching the group of manipulation components on the rear-side which is not used. Accordingly, in the embodiment, it is not necessary to perform the electric control to enable only one of the groups of manipulation components 79R and 79L.

Figure 6:
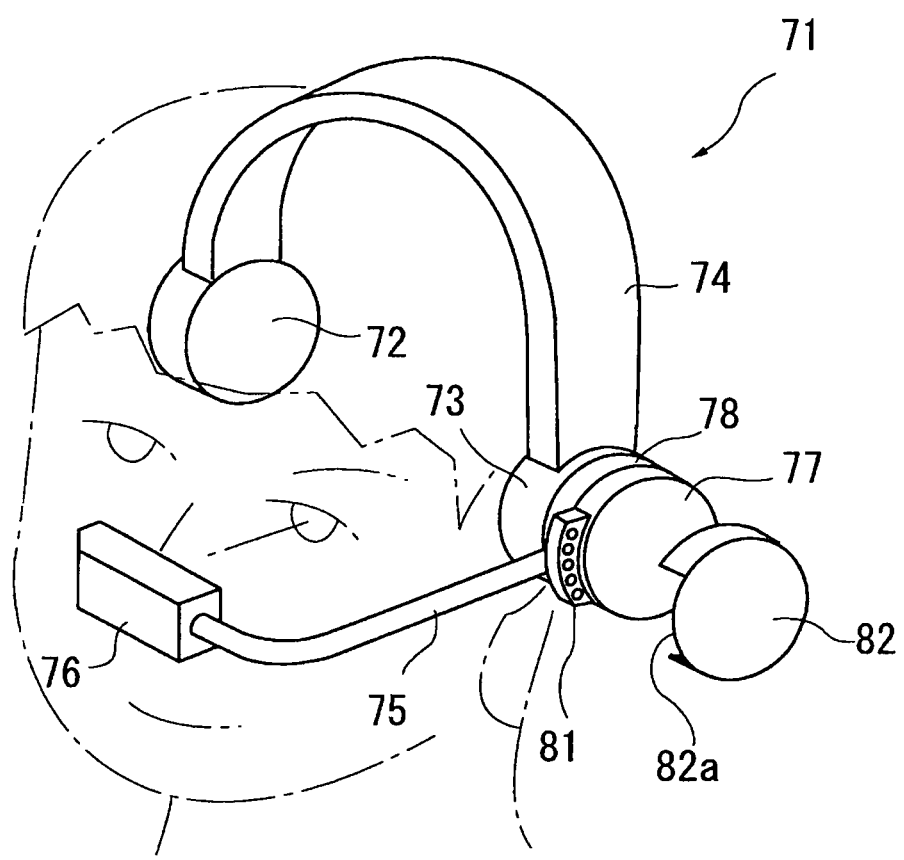
FIG. 6 is a view showing an outline of a head-mounted display according to a fifth embodiment of the present invention.

FIG. 6 is a view showing an outline of a head-mounted display according to a fifth embodiment of the present invention. The embodiment of FIG. 6 is identical to that of FIG. 5 in the basic configuration of the head-mounted display 71 except that a cover 82 with which the board 81 is covered is provided in the fifth embodiment. Because the cover 82 includes a notch 82a corresponding to a projection on one side of the board 81, the board 81 can be fitted in the cover 82 without mechanical interference between the projection of the board 81 and the cover.

When the cover 82 is set to the board 81, because the board 61 cannot be slid toward the rear side of the pressing member 77 in FIG. 6, the board 81 can be prevented from sliding in use to make manipulation difficult. When the head-mounted display 71 is used for the right eye, the cover 82 is turned by 180° from the state of FIG. 4 to cover the pressing member 77.

In the embodiment shown in FIG. 4, when the pressing member 77 is covered with a cover with which one of the groups of manipulation components 79R and 79L is covered, only the other group of manipulation components can be used.

The invention claimed is:

1. An output device which is used while mounted on a head in order to supply video, the output device comprising:
   two fixing units which are used to mount the output device on the head;
   a connection unit which connects the two fixing units;
   a display unit for displaying a video image to a single eye of a user, which is connected to one of the connection unit and the two fixing units; and
   a first group of manipulation members disposed in at least one of the fixing units,
   wherein the first group of manipulation members includes a plurality of switches which are arranged in a horizontal direction when the output device is mounted on the head and a plurality of switches which are arranged in a vertical direction when the output device is mounted on the head, and
   when the single eye for observing the display unit is switched between a right eye and a left eye, functions allocated to two of the plurality of switches which are arranged in the horizontal direction are exchanged with each other and functions allocated to the plurality of switches which are arranged in the vertical direction remain unchanged.

2. The output device according to claim 1, wherein a switch function, which remains unchanged when the single eye is switched between the right eye and the left eye, is further provided between the two of the plurality of switches which are arranged in the horizontal direction.

3. The output device according to claim 1, further comprising:
   a second group of manipulation members which is connected to the output device in a wired or wireless fashion to manipulate the output device or a device connected to the output device,
   wherein at least one of the first group of manipulation members and at least one of the second group of manipulation members have an identical function allocated to them, and
   in the second group of manipulation members, functions allocated to the switches of the second group of manipulation members corresponding to switches in which allocated functions are changed in the switches of the first group of manipulation members are not changed when the single eye for observing the display unit is switched between the right eye and the left eye.

4. The output device according to claim 1, wherein, in the first group of manipulation members, an operation performed by manipulation of one of the switches of the first group of manipulation members is not described in the switches of the second group of manipulation members in which the allocated function is changed when the single eye for observing the display unit is switched between the right eye and the left eye.

* * * * *

UNITED STATES PATENT AND TRADEMARK OFFICE
CERTIFICATE OF CORRECTION

| | | |
|---|---|---|
| PATENT NO. | : 8,451,229 B2 | Page 1 of 1 |
| APPLICATION NO. | : 12/309394 | |
| DATED | : May 28, 2013 | |
| INVENTOR(S) | : Otsuki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this
First Day of September, 2015

Michelle K. Lee
*Director of the United States Patent and Trademark Office*